United States Patent
Loh

(10) Patent No.: US 7,154,195 B2
(45) Date of Patent: Dec. 26, 2006

(54) DIGITAL SIGNAL VOTING SCHEME

(76) Inventor: Pit-Kin Loh, 53, Senawang Industrial Estate, Seremban, Negeri Sembilan (MY) 70450

(*) Notice: Subject to any disclaimer, the term of this patent is extended or adjusted under 35 U.S.C. 154(b) by 692 days.

(21) Appl. No.: 10/344,305

(22) PCT Filed: Aug. 8, 2001

(86) PCT No.: PCT/AU01/00970

§ 371 (c)(1), (2), (4) Date: Jul. 10, 2003

(87) PCT Pub. No.: WO02/13352

PCT Pub. Date: Feb. 14, 2002

(65) Prior Publication Data

US 2004/0088623 A1    May 6, 2004

(30) Foreign Application Priority Data

Aug. 8, 2000    (AU) ..................... PQ9268

(51) Int. Cl.
*H02J 7/00* (2006.01)
(52) U.S. Cl. .................. 307/65; 307/85
(58) Field of Classification Search .......... 307/65, 307/85
See application file for complete search history.

(56) References Cited

U.S. PATENT DOCUMENTS

| | | |
|---|---|---|
| 4,400,624 A | 8/1983 | Ebert, Jr. |
| 4,475,047 A | 10/1984 | Ebert, Jr. |
| 4,583,224 A * | 4/1986 | Ishii et al. ............. 714/10 |

FOREIGN PATENT DOCUMENTS

| | | |
|---|---|---|
| WO | 95/30949 | 11/1995 |
| WO | WO 97/14206 | 4/1997 |
| WO | 02/13352 | 2/2002 |

OTHER PUBLICATIONS

International Search Report.

* cited by examiner

Primary Examiner—Robert L. Deberadinis
(74) Attorney, Agent, or Firm—Ostrolenk, Faber, Gerb & Soffen, LLP

(57) ABSTRACT

A digital signal voting circuit (10) is described for each module in a modular uninterruptible power supply (UPS) in which a plurality of modules are connected in parallel. The voting circuit (10) includes a first comparator (14) for comparing a decision output signal of the voting circuit, and the cumulative effect of the decision output signals of the voting circuits in parallel modules, with a reference threshold signal ($V_{REF}$). Comparator (14) generates a first comparison result signal when the decision output signal (D) is greater than the reference threshold signal ($V_{REF}$). Logic element (12) has two inputs, one of which is fed with a control signal (A1) from the module and a second input which receives an output signal (A2) from the first comparator (14). When the output signal (A3) of logic element (12) is low, it will go high when either one of the input signals (A1 or A2) goes high. Likewise, when the Output (A3) is high, it will go low when either one of the input signals (A1 or A2) goes low, whichever is first. The voting circuit (10) also includes an avalanche detecting circuit (16) for detecting when an avalanche point is reached and generating a clear cut majority decision control signal at this point. By utilising an avalanche effects a definite majority decision can be effected as soon as more than 50% of the modules change state, thereby eliminating any jitter at the majority point. The digital signal voting scheme may be used in any multiple device system in which fail-safe operation by built-in redundancy is required.

9 Claims, 4 Drawing Sheets

DIGITAL SIGNAL VOTING SCHEME

FIELD OF THE INVENTION

The present invention relates to a digital signal voting scheme for a multiple device system in which fail-safe protection is required and relates particularly, though not exclusively, to such a scheme in a modular uninterruptible power supply (UPS) by which a majority decision capability of a plurality of modules in the UPS is effected.

BACKGROUND TO THE INVENTION

International application No. PCT/AU96/00637 (WO97/14206) describes a modular uninterruptible power supply (UPS) for connection, for example, between a mains power outlet and sensitive electric equipment such as a computer system. The disclosure of WO97/14206 is incorporated herein by reference. The modular UPS comprises a plurality of modules connected in parallel, each module being preferably "hot pluggable" in the housing of the UPS, whereby any module can be connected or disconnected from the housing without interrupting the flow of regulated electrical power from the UPS. Each module is provided with its own microcontroller that communicates via a control bus with control signal processing circuitry provided within the housing of the UPS. The control signal processing circuitry communicates with the microcontroller in each of the modules via a second control bus.

The control system processing circuitry allows a "majority rules" control system to be implemented whereby an alert control system output by each microcontroller is processed to determine the signal state of the majority of the microcontroller coupled in parallel, and the processed signal utilised to make a decision. For example, when a power fluctuation in the mains power supply is detected by the microcontroller of a module, that module outputs an alert control signal indicative of its detection, which is processed together with alert control signal from each other module connected in parallel. If the processed signal indicates that a majority of the modules have detected the power fluctuation, then the microcontrollers in all of the modules may act to supply power to the electrical apparatus from backup batteries rather than the mains power supply. In WO97/14206 the processing of the multiple alert control signals is effected by means of an impedance network which "averages" the alert control signals from the modules, wherein a majority decision is made by the microcontrollers on the basis of whether the "averaged" output from the impedance netword is greater than or less than a threshold value.

Although the impedance network for effecting a majority decision as described in WO97/14206 works well in most situations, there is a drawback with this method in some instances. As the number of modules in the UPS increases the incremental effect brought by each module's alert control signal becomes progressively smaller. This can lead to a jittery situation near the majority point as the control signal processing circuit tries to determined whether a majority vote has occurred. For example, if there are 10 modules connected in the housing then each module contributes 10% to the signal averaging effect. When five modules are in agreement, the signals are nearly 50% and could easily be 49% or 51% due to tolerances of electronic components or noise.

SUMMARY OF THE INVENTION

The present invention was developed with a view to providing a digital signal voting scheme for a modular UPS in which any jitter at the majority point is substantially eliminated. However, it is to be understood that the invention has wider application, and may be used in any multiple device system in which fail-safe protection is required.

Throughout this specification the term "comprising" is used inclusively, in the sense that there may be other features and/or steps included in the invention not expressly defined or comprehended in the features or steps subsequently defined or described. What such other features and/or steps may include will be apparent from the specification read as a whole.

According to one aspect of the present invention there is provided a digital signal voting circuit for each device in a multiple device system of the kind having a plurality of devices connected in parallel, the voting circuit comprising:

a first comparing means for comparing a decision output signal of the voting circuit and the cumulative effect of the decision output signals of the voting circuits in parallel devices, with a reference threshold signal representative of a predetermined proportion of the devices in the system, and generating a first comparison result signal when the decision output signal is greater than the reference threshold signal; and, a logic means having a fist input for receiving a control signal from the associated device and a second input for receiving said first comparison result signal and for generating said decision output signal whenever the signal on either one of the first and second inputs changes state;

wherein each said first comparing means in all of the remaining voting circuits of each of the other parallel devices will generate a first comparison result signal when the cumulative effect of the decision output signals exceeds the reference threshold signal at an avalanche point whereby, in use, all of the other devices will automatically respond once said predetermined proportion of devices has responded.

Preferably said voting circuit further comprises an avalanche detecting means for detecting when said avalanche point is reached and generating a majority decision control signal in response to said detection.

In one embodiment said avalanche detecting means comprises a second comparing means for comparing the decision output signal of the voting circuit with the reference signal, the second comparing means having a hysteresis around a centre voltage corresponding to the reference threshold signal.

According to another aspect of the present invention there is provided a digital signal voting method for each device in a multiple device system of the kind having a plurality of devices connected in parallel, the voting method comprising in each device, the steps of:

comparing a decision output signal of the device, and the cumulative effect of the decision output signals of the parallel devices, with a reference threshold signal representative of a predetermined proportion of the devices in the system, and generating a first comparison result signal when the decision output signal is greater than the reference threshold signal; and, generating said decision output signal whenever a control signal from the associated device or said first comparison result signal changes state;

wherein each of the other parallel devices will generate a first comparison result signal when the cumulative effect of the decision output signals exceeds the reference threshold signal at an avalanche point whereby, in use, all of the other devices will automatically respond once said predetermined proportion of devices has responded.

Preferably the method further comprises detecting when said avalanche point is reached and generating a majority decision control signal in response to said detection.

BRIEF DESCRIPTION OF DRAWINGS

In order to facilitate a better understanding of the nature of the invention a preferred embodiment of the digital signal voting circuit will now be described in detail, by way of example only, with reference to the accompanying drawings, in which.

DETAILED DESCRIPTION OF PREFERRED EMBODIMENT

Figure 1:
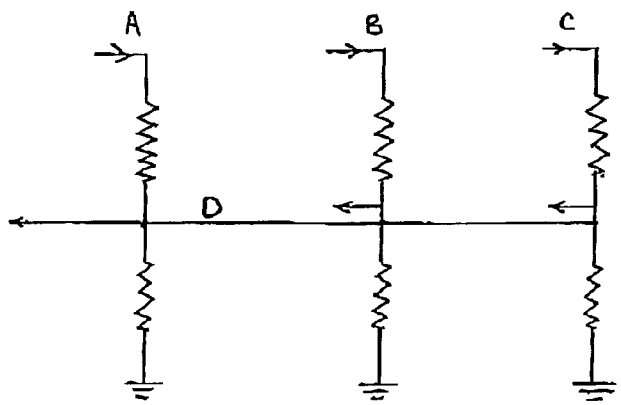
FIG. 1 is a circuit schematic for a prior art impedance network for effecting the majority is decision capability of a plurality of modules installed in a UPS.

The impedance network illustrated schematically in FIG. 1 is similar to that described in WO97/14206. Each module in the UPS of WO97/14206 will generate its own voltage based alert signal which is fed to the respective inputs A, B or C of the impedance network. In order to simplify the description, the alert signals from only three modules are considered. The voltage at D is read back to determine if a vote is in the majority, is that the majority of modules have detected an alert condition. If yes, then the decision signal D is valid. This voting process has the advantage that any number of modules (more than two) can be used. It is highly scalable and it can tolerate failure in any of the modules. Any module failure which may result in any of the signals at A, B or C to fail or be shorted, will not compromise the remainder.

As noted above, there is a drawback with this method when the number of modules connected in parallel in the UPS increases, since the incremental effect brought by each module signal becomes progressively smaller. The voting process then becomes less clear cut at the majority point and jitter occurs. Hence, for example, if there are 100 modules, then each module contributes only 1% and the probability of having a 49%/51% situation increases. The digital signal voting circuit of the present invention is designed to substantially eliminate any jitter at the majority point.

Figure 2:
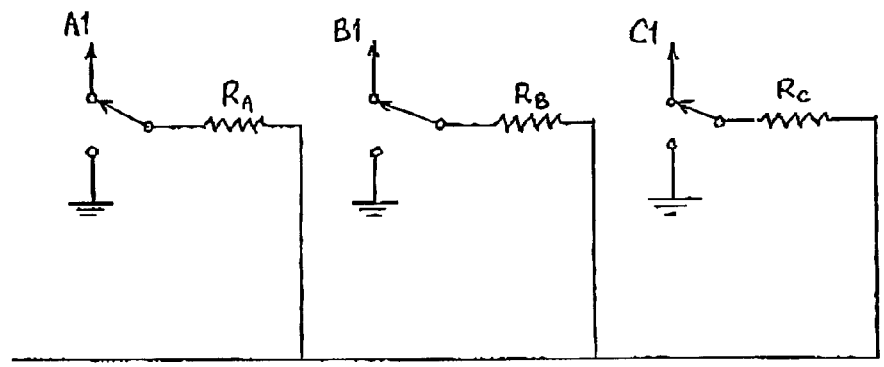
FIG. 2 is a circuit schematic for explaining the principle of operation of a preferred embodiment of a digital signal voting circuit according to the present invention.
Figure 3:
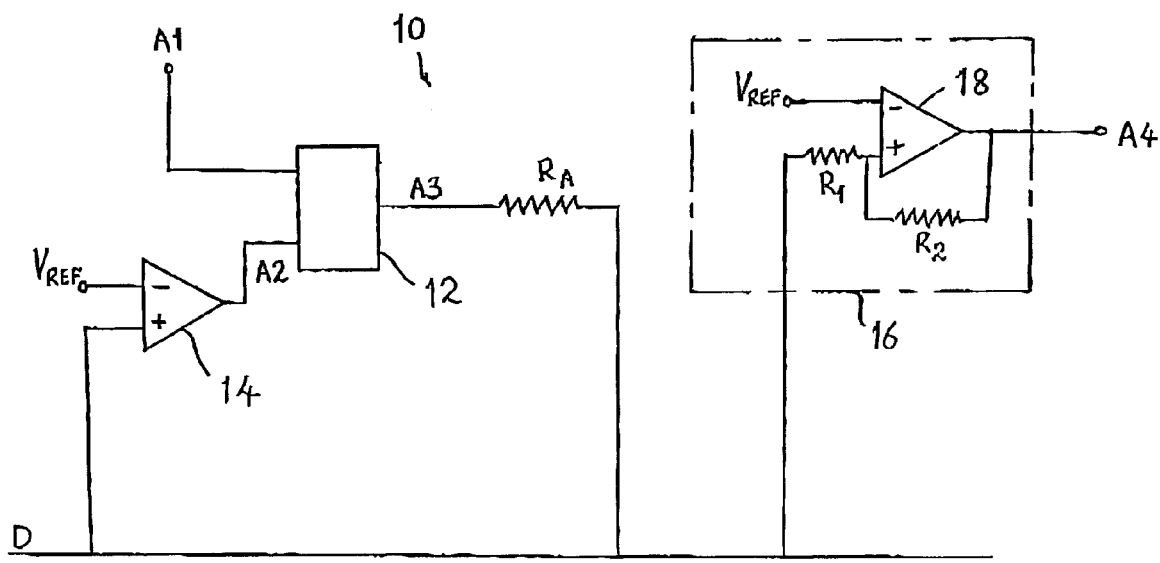
FIG. 3 is a circuit schematic for the preferred embodiment of a digital signal voting circuit according to the present invention.

Instead of using two resistors per module as in FIG. 1, the voting circuit preferably uses only one resistor. This gives the resulting decision output signal a much larger dynamic range. A preferred embodiment of the digital signal voting circuit in accordance with the present invention is illustrated in FIG. 3. The operation of the circuit in FIG. 3 will be described with reference to FIG. 2.

Each of the resistors $R_A$, $R_B$ and $R_C$ is fed with either a high or low signal in each module, depending on whether or not an alert condition is detected by the module. When all of the control signals are high at A1, B1 and C1 the decision output signal at D will be high, whereas when all of the inputs are low the output at D will be low. This contrasts with the prior art circuit of FIG. 1, where the maximum output voltage is determined by the dividing ratio of the two resistors (typically ⅔). Besides providing a wider signal range, the voting circuit also employs a new voting process that results in a more definite majority decision.

Figure 5:
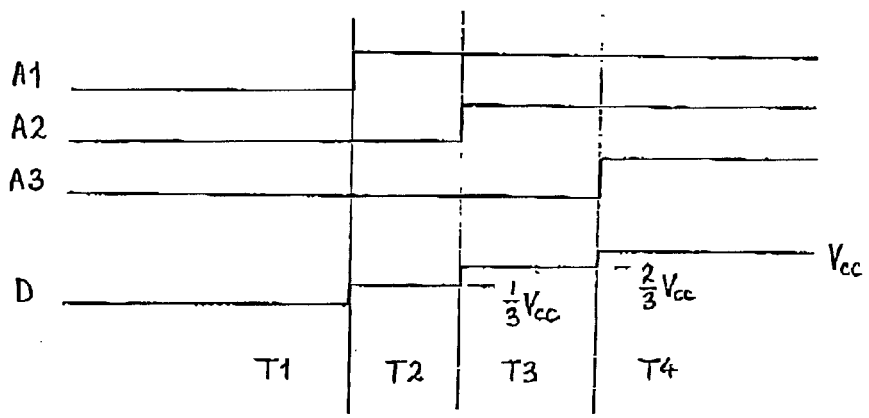
FIG. 5 illustrates graphically the relationship of a decision output signal to the input control signals from a plurality of modules in the UPS using the circuit of FIG. 2.
Figure 6:
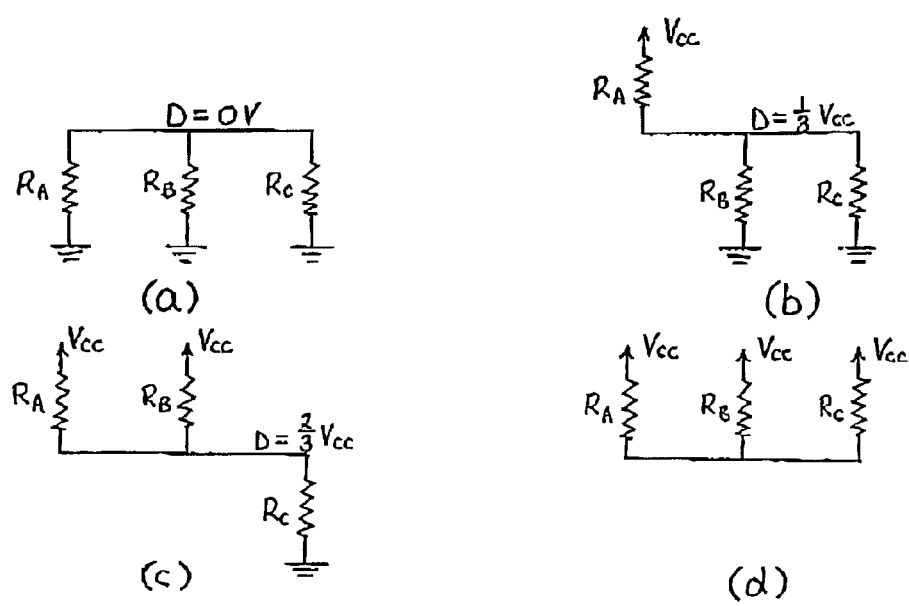
FIGS. 6(*a*), (*b*), (*c*) and (*d*) are circuit schematics for explaining the generation of the decision output signal illustrated in FIG. 5.

FIG. 3 illustrates a preferred embodiment of the digital signal voting circuit for one module of a modular UPS, in which a plurality of modules are connected in parallel. Each of the modules will generate a control signal when it detects an alert condition A1 is the signal generated by module A, B1 is the signal generated by module B and C1 is the signal generated by module C. In the situation where A1, B1 and C1 are not going high at the same time, the signal at D in FIG. 2 will be as shown in FIG. 5. During time interval T1 signals A1, B1 and C1 are all low, and the resistors in the circuit of FIG. 2 are effectively connected as shown in FIG. 6(*a*). Since all three resistors $R_A$, $R_B$ and $R_C$ are all grounded the voltage at D equals 0 V. At time T2, control signal A1 goes high and therefore the state of the circuit changes to that illustrated in FIG. 6(*b*). The resistors $R_A$, $R_B$ and $R_C$ act as a voltage divider so that the voltage at D equals ⅓$V_{CC}$ (assuming $R_A=R_B=R_C$). At time T3, signal B1 also goes high, so that the circuit now looks like that illustrated in FIG. 6(*c*). Hence, the voltage at D is now ⅔$V_{CC}$. Finally, at T4 the control signal C1 also goes high so that the resistor circuit now looks like that illustrates in FIG. 6(*d*) and the voltage at D=$V_{CC}$.

Figure 7:
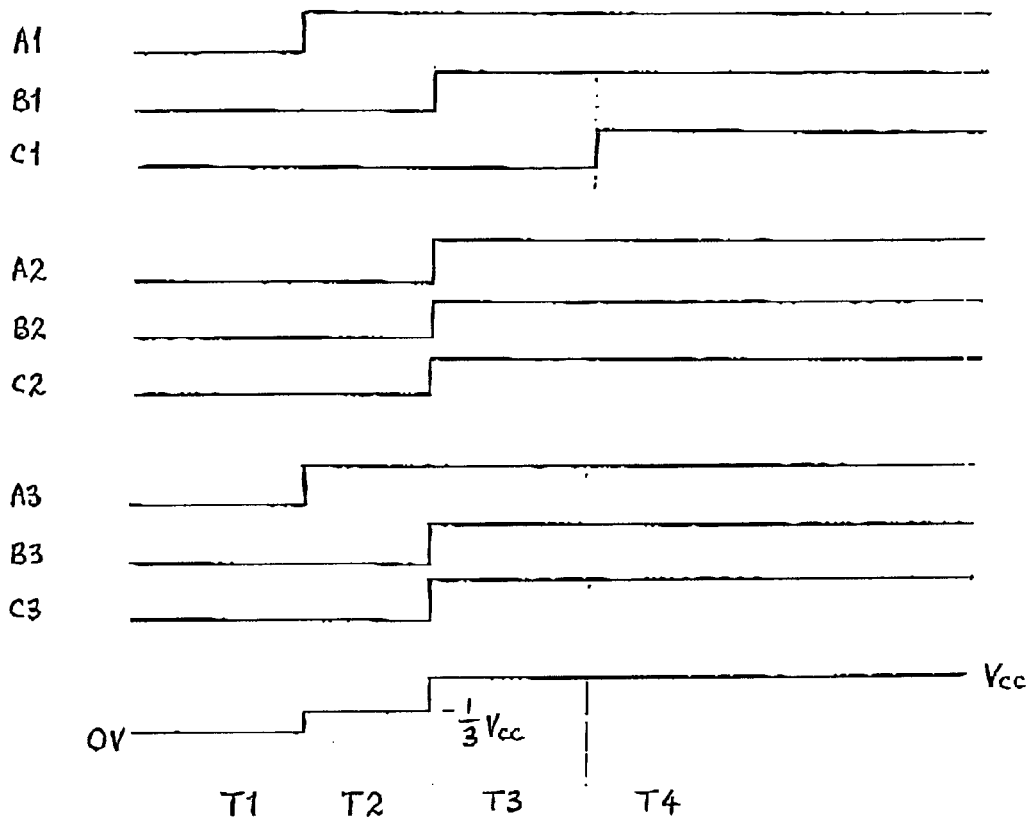
FIG. 7 illustrates graphically the relationship of a decision output signal to the input control signals from a plurality of modules in the UPS using the circuit of FIG. 3.

However, if the same control signals A1, B1 and C1 are applied to the voting circuit of FIG. 3, the resultant signal at D will be as illustrated in FIG. 7 (the circuit of FIG. 3 is repeated for signals B1 and C1). As can be seen in FIG. 7, the voltage at D has skipped the ⅔ $V_{CC}$ output level and gone straight to $V_{CC}$ at T3. The reason for this will become apparent from the following description of the manner in which the voting circuit of FIG. 3 operates.

Figure 4:
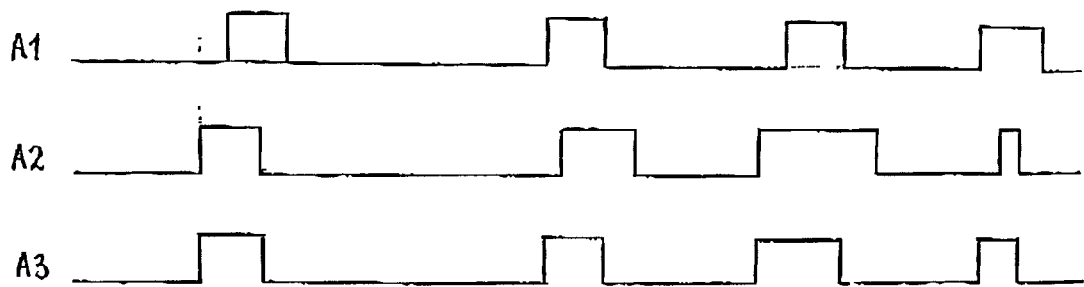
FIG. 4 illustrates graphically the relationship of some of the signals in the circuit of FIG. 3.

In the voting circuit of FIG. 3, the resistor $R_A$ (equivalent to that illustrated in FIG. 2) is driven by the output signal A3 from a logic element 12. Logic element 12 has two inputs, one of which is fed with the control signal A1 from the module, and a second input which receives an output signal A2 from a first comparator 14. The relationship of the signals A1, A2 and A3 is illustrated graphically in FIG. 4. When the output signal A3 is low, it will go high when either one of the input signals A1 or A2 goes high. Likewise, when the output A3 is high, it will go low when either one of the input signals A1 or A2 goes low, whichever is first. That is, the logic element 12 responds to the first rising edge of either A1 or A2 when the output A3 is low, and when the output A3 is high it responds to the first filling edge of either one of the input signals A1 or A2.

The first comparator 14 compares the level of the decision output signal at D with a reference signal $V_{REF}$ and generates a first comparison result signal in response thereto. When the level of the decision output signal at D is greater than $V_{REF}$ the first comparison result signal at the output A2 of comparator 14 goes high. It is now possible to describe why the decision output signal at D in FIG. 3 takes the form illustrated in FIG. 7.

In FIG. 7, signals B2 and C2 correspond to the second input signals of the respective logic elements in the voting circuits for modules B and C respectively. Similarly, signals B3 and C3 correspond to the output signals of the respective logic elements in the voting circuits for modules B and C respectively.

At time T1 the output signal at A3 of logic element 12 goes high in response to the control signal on A1 going high. At this point in time the decision output signal at D is at $\frac{1}{3}V_{CC}$. Likewise, at time T2 the output signal at B3 of logic element 12 (in the voting circuit of module B) goes high in response to the control signal on B1 going high. At time T3 the voltage at D skips the $\frac{2}{3} V_{CC}$ level and goes straight to $V_{CC}$. This is because when signal B1 goes high at T3 and sets $R_B$ high, the voltage at D will briefly go to $\frac{2}{3} V_{CC}$, and this will be detected by the fist comparator in the voting circuits of all of the other modules.

With $V_{REF}$ set to $\frac{1}{2} V_{CC}$ in all of the modules, the output signal of the first comparator 14 in all of the remaining modules will go high. This results in all of the remaining resistors $R_B$ and $R_C$ switching at this point and thus bringing the voltage at D to $V_{CC}$. Because of the rapid switching of all of the first comparators in the remaining modules at this point it is referred to as the avalanche point.

Figure 8:
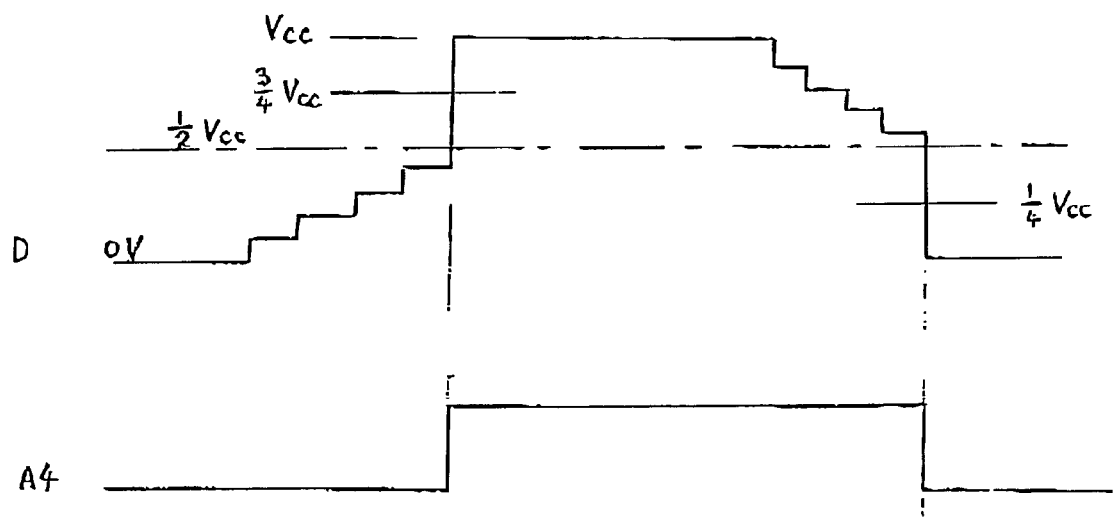
FIG. 8 illustrates graphically the timing of a decision output signal using the circuit of FIG. 3; and, FIGS. 9 (*a*) and (*b*) illustrate graphically a typical decision output signal with many modules voting using the circuit of FIG. 3.

The voting circuit preferably also includes an avalanche detecting circuit 16 for detecting when this avalanche point is reached and generating a clear cut majority decision control signal at this point. In the illustrated embodiment, the avalanche detecting circuit 16 comprises a second comparator 18 for comparing the decision output signal of the voting circuit at D with the reference signal $V_{REF}$. By setting the resistors $R_1$ and $R_2$ to give the second comparator 18 a hysteresis around a centre voltage of $V_{REF}$, it can be used to detect the avalanche point and generate the clean, clear cut, majority signal. Thus, for example, if $R_1$ and $R_2$ are set so that a hysteresis of plus or minus $\frac{1}{4} V_{CC}$ hysteresis is produced, then the output of the second comparator 18 will change state at $\frac{1}{4} V_{CC}$ and $\frac{3}{4} V_{CC}$ respectively. When the output of comparator 18 is low it will change to high when the decision output signal at D $\frac{3}{4} V_{CC}$, whereas when the output of comparator 18 is high, it will change to low when the decision output signal at D is $\frac{1}{4} V_{CC}$. The timing diagram in FIG. 8 illustrates the signal produced at the output A4 of the second comparator 18 as the decision output signal at D ramps up and down. With this new method of detecting a majority vote, when the number of control signals from a plurality of modules going high reaches 50%, the voting circuit will create an avalanche effect and flip to 100% rapidly.

Figure 9:
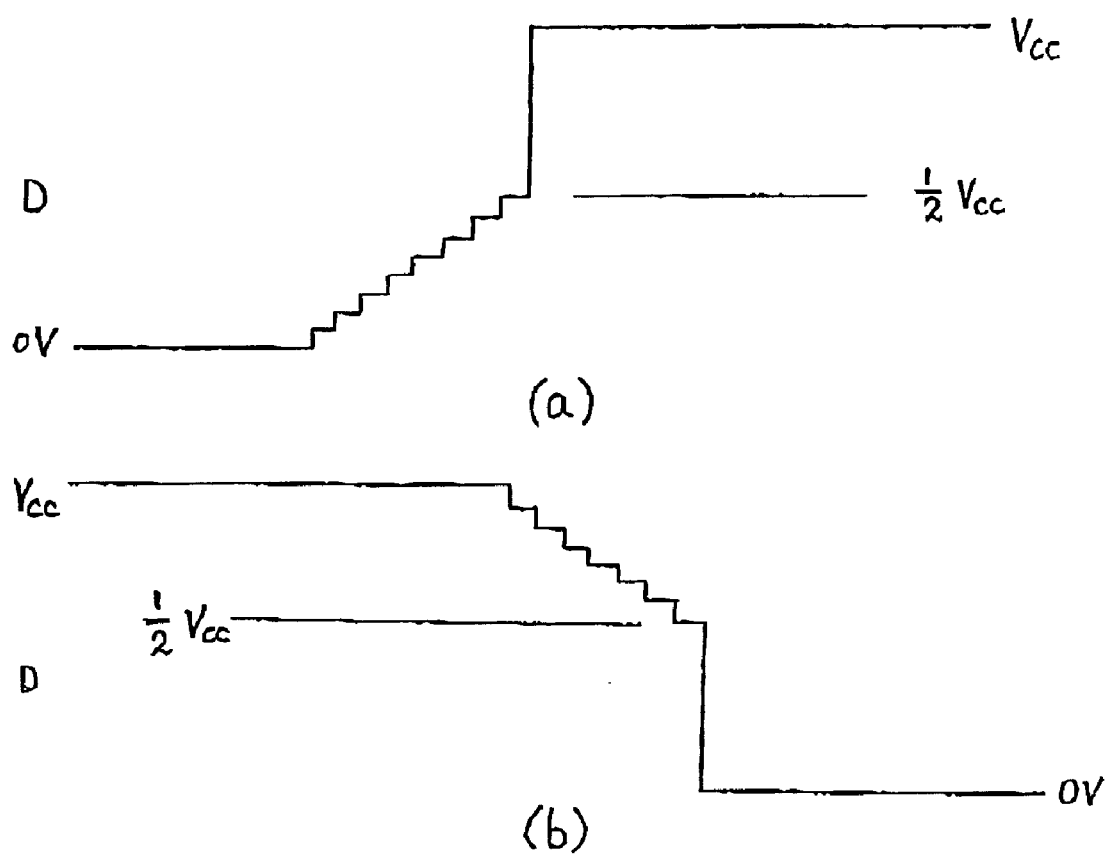

A typical decision output signal at D with many modules voting is illustrated in FIG. 9(a). Likewise, on a reverse process where the control signals from modules A1, B1, C1, D1, etc. are changing from high to low, the resulting decision output signal at D will typically ramp down to $\frac{1}{2} V_{CC}$, at which point the avalanche effect will occur and the output signal will rapidly drop to zero volt as illustrated in FIG. 9(b). Hence, when more than 50% of the modules agree on going low, then the avalanche effect will bring them all to 100% low. This may occur, for example, when the mains power supply, which was temporarily unavailable returns, and it is no longer necessary to rely on battery back-up power.

From the above description of a preferred embodiment of the digital signal voting circuit in accordance with the invention, it will be apparent that the potential problems in the prior art circuit with jitter at the majority point have been substantially eliminated. By utilising an avalanche effect, a definite majority decision can be effected as soon as more than 50% of the modules change state. It will be seen that the digital voting scheme can also be readily modified to suit many other applications where a parallel redundant structure, that is fail safe and that does not require a master, can advantageously be implemented. For example, in alarm systems which require high reliability (like in a nuclear power plant or in the Pentagon), where sensor failure or controller failure are not acceptable. Multiple sensors and controllers may be deployed to ensure that there is no single point failure. One way to handle the multiple devices is to have a central controller that will monitor all the devices and decide on the status and issue an alarm condition is required. This is easy to implement and can deal with sensor failures and other downstream failures. However, there is no guarantee that the central controller itself will not go out of action or make a faulty decision. If on the other hand each device is made independent and does not report to a central controller then there will not be a single point failure, however, a mechanism is required to allow all the devices in the system have a chance to participate in the decision process. So if there are, for example, five sensors and controllers in each locality, each of which would react to an alarm condition independently, and the results are submitted to all the other devices to vote on, the result that wins the majority vote will be the final decision. Say if three sensors sensed an alarm condition and two did not, then in a simple majority vote the decision is that there is an alarm condition. The above is a typical situation and illustrates the way in which the voting scheme of the present invention can ensure fail-safe operation by built-in redundancy at every point of the system.

There are many other systems that similarly require absolute reliability and would therefore need a voting process to complete the picture. The digital signal voting scheme of the present invention can be readily adopted to most of such systems.

Numerous variations and modifications will suggest themselves to persons skilled in the electronics arts, in addition to those already described, without departing from the basic inventive concept. For example, already suitable circuit for detecting when the avalanche point is reached can be used instead of the second comparator, for generating a majority decision control signal. Furthermore, by selecting $V_{REF}=\frac{1}{2}V_{CC}$ a simple majority vote is obtained. However $V_{REF}$ can be set to any desired value in order to change the magnitude of the majority vote. All such variations and modifications arm to be considered within the scope of the present invention, the nature of which is to be determined from the foregoing description and the appended claims.

The invention claimed is:

1. A digital signal voting circuit for each device in a multiple device system of the kind having a plurality of devices connected in parallel, the voting circuit comprising:
   a first comparing means for comparing a decision output signal of the voting circuit, and the cumulative effect of the decision output signals of the voting circuits in parallel devices, with a reference threshold signal representative of a predetermined proportion of the devices in the system, and generating a first comparison result signal when the decision output signal is greater than the reference threshold signal; and, a logic means having a first input for receiving a control signal from the associated device and a second input for receiving said first comparison result signal and for generating said decision output signal whenever the signal on either one of the first and second inputs changes state;

wherein each said first comparing means in all of the remaining voting circuits of each of the other parallel devices will generate a first comparison result signal when the cumulative effect of the decision output signals excess the reference threshold signal at an avalanche point whereby, in use, all of the other devices will automatically respond once said predetermined proportion of devices has responded.

2. A digital signal voting circuit as defined in claim 1, wherein said voting circuit further comprises an avalanche detecting means for detecting when said avalanche point is reached and generating a majority decision control signal in response to said detection.

3. A digital signal voting circuit as defined in claim 2, wherein said avalanche detecting means comprises a second comparing means for comparing the decision output signal of the voting circuit with the reference signal, the second comparing means having a hysteresis around a centre voltage corresponding to the reference threshold signal.

4. A digital signal voting circuit as defined in claim 1, wherein said logic means responds to the first rising edge of a signal on the first or second inputs when the decision output signal is low, and when the decision output signal is high it responds to the first failing edge of a signal on the first or second inputs.

5. A digital signal voting method for each device in a multiple device system of the kind having a plurality of devices connected in parallel, the voting method comprising in each device, the steps of:

comparing a decision output signal of the device, and the cumulative effect of the decision output signals of the parallel devices, with a reference threshold signal representative of a predetermined proportion of the devices in the system, and generating a first comparison result signal when the decision output signal is greater than the reference threshold signal; and, generating said decision output signal whenever a control signal from the associated device or said first comparison result signal changes state;

wherein each of the other parallel devices will generate a first comparison result signal when the cumulative effect of the decision output signals exceeds the reference threshold signal at an avalanche point whereby, in use, all of the other devices will automatically respond once said predetermined proportion of devices has responded.

6. A digital signal voting circuit as defined in claim 5, wherein the method further comprises detecting when said avalanche point is reached and generating a majority decision control signal in response to said detection.

7. A digital signal voting circuit as defined in claim 6, wherein said step for detecting when said avalanche point is reached involves comparing the decision output signal with the reference threshold signal, said majority decision control signal being generated using a hysteresis around a centre voltage corresponding to the reference threshold signal.

8. A digital signal voting circuit as defined in claim 5, wherein said decision output signal is generated whenever the first rising edge of said control signal from the associated device or said first comparison result signal is detected.

9. A modular uninterruptible power supply (UPS) comprising a plurality of modules connected in parallel, each module incorporating a digital signal voting circuit as defined in claim 1.

* * * * *